H. H. HIVELY.
SECTIONAL TIRE RIM.
APPLICATION FILED APR. 6, 1917.
1,424,476.                                        Patented Aug. 1, 1922.
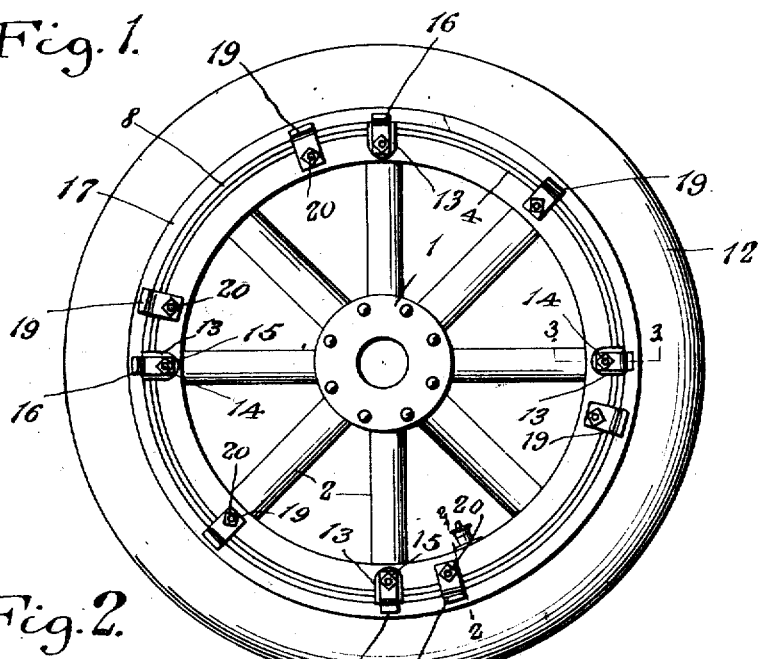
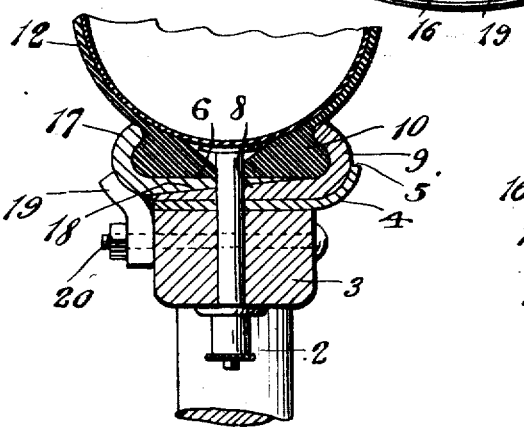
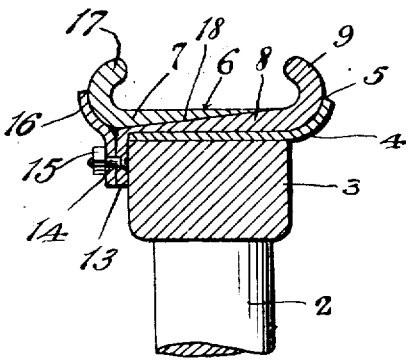
Inventor
H. H. Hively.

UNITED STATES PATENT OFFICE.

HAL H. HIVELY, OF TAR RIVER, OKLAHOMA.

SECTIONAL TIRE RIM.

1,424,476.     Specification of Letters Patent.     Patented Aug. 1, 1922.

Application filed April 6, 1917. Serial No. 160,205.

*To all whom it may concern:*

Be it known that I, HAL H. HIVELY, a citizen of the United States, residing at Tar River, in the county of Ottawa and State of Oklahoma, have invented certain new and useful Improvements in Sectional Tire Rims; and I do hereby declare the following to be a full, clear, and exact description of the invention, such as will enable others skilled in the art to which it appertains to make and use the same.

This invention relates to improvements in a sectional tire rim as set forth in my application for Letters Patent, serially numbered 139,728, filed Dec. 30, 1916, and has for one of its objects the provision of means whereby an inflated tire may be supported by the sectional rim when in a carrier or tire rack.

Another object of this invention is to provide means upon one section of the sectional rim adapted to engage the other section for preventing the sections from parting when removed from a wheel, thus obviating the necessity of having the tire deflated when applying and removing the sectional rim on the wheel.

A further object of this invention is the provision of a plurality of lips formed upon one edge of one of the sections of the sectional rim and having removably secured thereto, cleats, which are adapted to engage the other section of the sectional rim to hold the sections from parting, thus providing a demountable rim consisting of a pair of sections, which may be removed from a wheel without detaching the sections from each other.

A still further object of this invention is the provision of a sectional tire rim of the above stated character, which shall be simple, durable and efficient, and which may be manufactured and sold at a comparatively low cost.

With these and other objects in view, as will become more apparent as the description proceeds, the invention consists of certain novel features of construction, combination and arrangement of parts, as will be hereinafter more fully described and claimed.

For a complete understanding of my invention, reference is to be had to the following description and accompanying drawing, in which:

Figure 1 is a side elevation of a sectional tire rim constructed in accordance with my invention, Figure 2 is a fragmentary sectional view taken on the line 2—2 of Figure 1, Figure 3 is a similar view with the tire removed taken on the line 3—3 of figure 1.

Referring in detail to the drawing, the numeral 1 indicates the hub of a wheel having the usual radial spokes 2 on which is secured the felly 3. The felly 3 has shrunk or otherwise secured thereon, a felly band 4, which has one edge projecting beyond one edge of the felly 3, as clearly illustrated in Figure 3, and curved upwardly to form a retaining flange 5.

A sectional rim 6 consists of a pair of sections 7 and 8. The section 8 is adapted to be positioned upon the band 4 and has one edge thereof bent upwardly to form a tire engaging flange 9, which is adapted to receive one of the beads 10 of a tire 12. Formed upon the opposite edge of the section 8 from the flange 9 are a plurality of relatively spaced lips 13, having countersunk apertures to receive bolts 14, which are provided with nuts 15. Carried by the bolts 14 are retaining cleats 16. The section 7 of the sectional rim 6 is provided with one edge bent upwardly to form a tire engaging flange 17, adapted to receive the other bead 10 of the tire 12.

The under face of the section 7 is beveled for cooperation with the beveled face 18 formed upon the upper face of the section 8 of the sectional rim 6. The section 7 is of a lesser width than the section 8 so that its reduced or tapered free edge terminates at a point adjacent the flange 9 of the section 8 so as to provide a substantially even face for the tire 12 to rest upon.

When applying a tire to the sectional rim, the tire is first positioned upon the section 8 of the sectional rim 6 and the section 7 is then applied, then the cleats 16 are moved into engagement with the flange 17 of the section 7, whereby the sections 7 and 8 are firmly secured together. The tire 12 is then inflated in the usual manner, which causes pressure upon the flanges 9 and 17, which causes a strain upon the cleats 16, preventing them from accidentally moving upon the bolts 14.

After the tire has been placed upon the sectional rim 6, and inflated, the sectional rim then may be readily placed upon the felly band 4 and retained thereon by a plurality of cleats 19 carried by bolts 20 which extend through the felly 3.

From the foregoing description taken in connection with the accompanying drawing, it will be noted that a sectional rim has been provided, which may be readily removed from a wheel, while the tire is inflated without the danger of the sections of the sectional rim becoming separated. It will also be noted that a convenient form of demountable rim has been provided, whereby the sections of the sectional rim may be separated for removing and applying a tire.

While I have shown and described the preferred embodiment of my invention, it will be understood that minor changes in construction, combination and arrangement of parts may be made without departing from the spirt and scope of the invention as claimed.

Having thus described my invention, what I claim is:—

A means for fastening demountable rims to the felly of a wheel comprising a pair of annular members adapted to grip the beads of a tire and movable relative to each other, one of the members extending in a plurality of ears inwardly along the side of the felly and carrying clips adapted to retain the said members in a predetermined relative position to each other, and clips adapted to be placed upon the felly between the said ears and to perform the dual function of cooperating with said first clips to retain the said members together and also to retain the said members to the rim and adapted to be turned upon an axis to allow of the removal from the felly of the said demountable rim members.

In testimony whereof I affix my signature in presence of two witnesses.

HAL H. HIVELY.

Witnesses:
CHARITY MACKEY,
W. E. GOULD.